US008295413B2

(12) United States Patent
Sasaoka et al.

(10) Patent No.: US 8,295,413 B2
(45) Date of Patent: Oct. 23, 2012

(54) DOPPLER FREQUENCY ESTIMATING DEVICE, RECEIVING DEVICE, RECORDING MEDIUM AND DOPPLER FREQUENCY ESTIMATING METHOD

(75) Inventors: Naoto Sasaoka, Tottori (JP); Yoshio Itoh, Tottori (JP)

(73) Assignee: Semiconductor Technology Academic Research Center, Yokohama-shi (JP)

( * ) Notice: Subject to any disclaimer, the term of this patent is extended or adjusted under 35 U.S.C. 154(b) by 435 days.

(21) Appl. No.: 12/622,259

(22) Filed: Nov. 19, 2009

(65) Prior Publication Data

US 2010/0128823 A1    May 27, 2010

(30) Foreign Application Priority Data

Nov. 21, 2008    (JP) .................................. 2008-297753

(51) Int. Cl.
*H04L 27/06*    (2006.01)
(52) U.S. Cl. ........................................................ 375/344
(58) Field of Classification Search ................... 375/344
See application file for complete search history.

(56) References Cited

U.S. PATENT DOCUMENTS

| 7,349,483 B2 * | 3/2008 | Seki et al. ..................... 375/260 |
| 7,724,694 B2 * | 5/2010 | Okada ............................ 370/310 |
| 7,983,360 B2 * | 7/2011 | Tanaka et al. .................. 375/316 |
| 2008/0063040 A1 | 3/2008 | Akahori |
| 2008/0101216 A1 | 5/2008 | Tanaka |
| 2009/0323789 A1 * | 12/2009 | Ragab et al. ................... 375/224 |
| 2009/0323790 A1 * | 12/2009 | Yousef ........................... 375/224 |
| 2011/0032837 A1 * | 2/2011 | Luschi et al. ................... 370/252 |

FOREIGN PATENT DOCUMENTS

| JP | 11-234190 A | 8/1999 |
| JP | 2008-072387 A | 3/2008 |
| JP | 2008-118194 A | 5/2008 |

OTHER PUBLICATIONS

Li, "Time-variant Doppler frequency estimation and compensation for mobile OFDM systems" WCNC 2006, Wireless Communications and Networking Conference, 2006, IEEE Issue Date: Apr. 3-6, 2006 on pp. 1040-1045.*
Sugawara, "Doppler Frequency Estimation Schemes for Multi-carrier Systems" International Symposium on Communications and Information Technologies, 2006, ISCIT '06, Issue Date: Oct. 18, 2006-Sep. 20, 2006 on pp. 649-652.*

(Continued)

*Primary Examiner* — Juan A Torres
(74) *Attorney, Agent, or Firm* — Christensen O'Connor Johnson Kindness PLLC

(57) ABSTRACT

A device of an example of the invention comprises a first section of which performs inverse fast Fourier transform for a channel estimation value obtained by channel estimation to obtain a channel impulse response, a second section which selects paths that belong to a group having a large element based on elements of paths for the channel impulse response, a third section which calculates autocorrelation values by time averaging for each of the paths selected by the second section, a fourth section which obtains an ensemble average value of the autocorrelation values by time averaging obtained by the third section, and a fifth section which obtains a Doppler frequency associated with the ensemble average value based on a characteristic of a relationship between an autocorrelation value and a Doppler frequency and the ensemble average value.

13 Claims, 5 Drawing Sheets

OTHER PUBLICATIONS

IEEE, IEEE802.11a standard Wireless LAN medium access control (MAC) and Physical Layer (PHY) specifications, IEEE 1999 p. 24 figure 118.*

Notice of Reasons for Rejection dated Aug. 16, 2010, issued in corresponding Japanese Application No. 2008-297753, filed Nov. 21, 2008, 8 pages.

Fette, B., "Cognitive Radio Technology," Newnes, Burlington, Mass., 2006, Chap. 7, "Cognitive Techniques: Physical and Link Layers," pp. 222-225.

Haykin, S., "Cognitive Radio: Brain-Empowered Wireless Communications," IEEE [Institute of Electrical and Electronics Engineers] Journal on Selected Areas in Communications 23(2):201-220, Feb. 2005.

Itami, M., "Comprehensible OFDM Technology," Ohmsha Ltd., Tokyo, 2005, pp. 32-37.

Mitola, J., III, "Cognitive Radio Architecture: The Engineering Foundations of Radio XML," Wiley, Hoboken, N.J., 2006, pp. 1-2.

Mitola, J., III, and G.Q. Maguire, Jr., "Cognitive Radio: Making Software Radios More Personal," IEEE [Institute of Electrical and Electronics Engineers] Personal Communications 6(4): Aug. 13-18, 1999.

Sugawara, T., et al., "A Study of Adaptive OFDM Systems to Environment," IEICE [Institute of Electronics, Information and Communication Engineers] Technical Report SR2006-57 106(395):111-116, Nov. 2006.

Yamamoto, J., et al., "A Study of Terminal Assignment Procedure for Cognitive Radio," IEICE [Institute of Electronics, Information and Communication Engineers] Technical Report SR2006-41 106(395): Nov. 1-4, 2006.

* cited by examiner

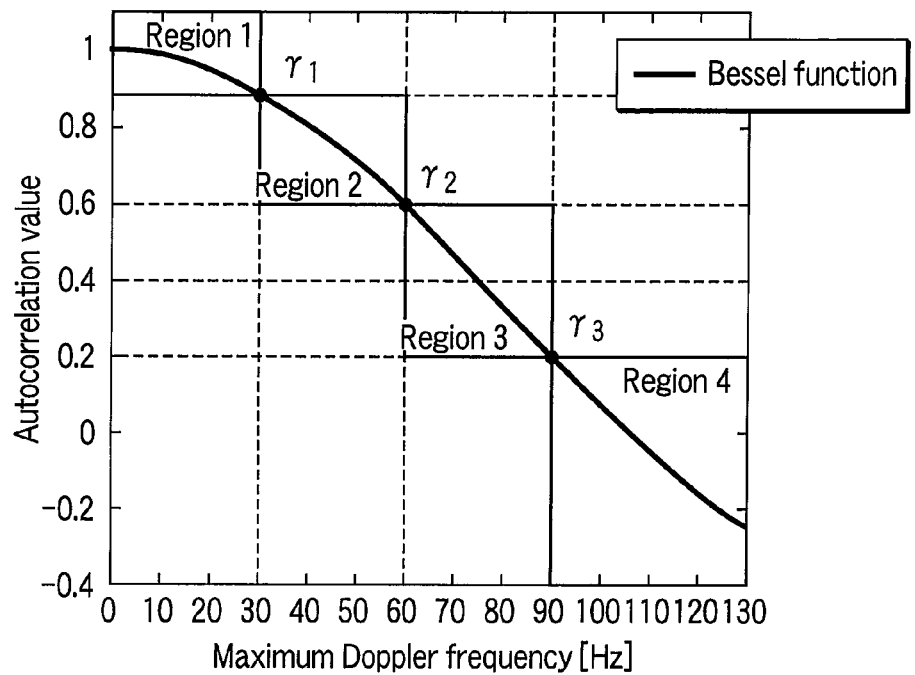
F I G. 5
Table 1 : HIPERLAN/2  Model A
| Delay [ns] | Average relative Power [dB] |
|---|---|
| 0 | 0.0 |
| 10 | -0.9 |
| 20 | -1.7 |
| 30 | -2.6 |
| 40 | -3.5 |
| 50 | -4.3 |
| 60 | -5.2 |
| 70 | -6.1 |
| 80 | -6.9 |
| 90 | -7.8 |
| 110 | -4.7 |
| 140 | -7.3 |
| 170 | -9.9 |
| 200 | -12.5 |
| 240 | -13.5 |
| 290 | -18.0 |
| 340 | -22.4 |
| 390 | -26.7 |
F I G. 6

DOPPLER FREQUENCY ESTIMATING DEVICE, RECEIVING DEVICE, RECORDING MEDIUM AND DOPPLER FREQUENCY ESTIMATING METHOD

CROSS-REFERENCE TO RELATED APPLICATIONS

This application is based upon and claims the benefit of priority from prior Japanese Patent Application No. 2008-297753, filed Nov. 21, 2008, the entire contents of which are incorporated herein by reference.

BACKGROUND OF THE INVENTION

1. Field of the Invention

The present invention relates to a Doppler frequency estimating device that estimates a Doppler frequency in a communication system, a receiving device, a recording medium, and a Doppler frequency estimating method.

2. Description of the Related Art

In recent years, orthogonal frequency division multiplexing (OFDM) having a high frequency utilization efficiency is adopted to realize a high-speed wireless communication system (Document 1).

An OFDM system attracts attention as a technology that realizes high-speed wireless communication, and the demand for the OFDM system is high. The OFDM system is utilized for a wireless LAN based on IEEE 802.11a/g/n or the like, a wireless MAN such as WiMAX, or terrestrial digital broadcasting.

On the other hand, with the rapid spread of wireless communication systems, a frequency utilization efficiency may become a problem in some cases. Thus, a radio equipment is provided with a function of recognizing a peripheral radio wave environment, and realizing cognitive radio that selects an optimum communication scheme in accordance with such an environment is expected (Documents 2-4). At the present day, in the cognitive radio, the study for detecting a vacant frequency band and dynamically distributing a frequency is mainly examined (Document 5). The technology that changes not only a frequency band but also various parameters in a communication system, e.g., a modulation scheme or a transmission rate in accordance with a channel environment to thereby improve a transmission efficiency is also suggested (Document 6).

As indexes for a channel state, there are, e.g., an SNR (Signal Noise Ratio), a multipath profile, a delay spread, a maximum delay time of a delay wave, a Doppler frequency, and others. In particular, in mobile wireless communication, fading due to Doppler becomes a problem in a channel environment. A channel becomes a non-stationary because of an influence of Doppler, and a channel coherence time is decreased with an increase in a maximum Doppler frequency. As a result, a degradation in channel estimation accuracy in a receiver, i.e., ICI (Inter-channel Interference) occurs, which causes degradation in a communication quality in some cases. Therefore, a study for adaptively selecting an FFT (Fast Fourier Transform) point number by using an estimated maximum Doppler frequency is conducted (Document 7).

However, to adopt such a technique, a sufficient estimation accuracy for a maximum Doppler frequency is required.

It has been conventionally known that a relationship between an autocorrelation value of Rayleigh fading and a maximum Doppler frequency can be approximated by a Bessel function, and a technique for estimating the maximum Doppler frequency by using such characteristics is suggested (Document 7).

Further, Document 8 discloses a correlation estimating technique in a CDMA scheme.

In Document 7 that discloses a conventional technique, the Bessel function indicative of the relationship between the autocorrelation value of a Rayleigh wave and the maximum Doppler frequency is utilized to estimate the maximum Doppler frequency. In this technique, to estimate the maximum Doppler frequency for a channel, an autocorrelation value based on time averaging of the Rayleigh wave must be estimated. According to this conventional technique, the autocorrelation value alone of a path having an SNR that becomes maximum when the channel is a multipath is used, ergodic properties are presupposed for the estimation of the autocorrelation, and a time average value based on a single path is utilized to estimate the maximum Doppler frequency. According to this conventional technique, an estimation accuracy for the maximum Doppler frequency may be degraded.

Furthermore, the convergence rate of the estimation is decreased.

Moreover, in Document 8, a method that utilizes a multipath is suggested as the CDMA maximum Doppler frequency estimating method, but an accuracy for separating the multipath is low, obtaining a sufficient estimation accuracy for the maximum Doppler frequency is difficult, and a path selection technique is not examined. Therefore, it is difficult to apply Document 8 to, e.g., a communication system adopting an OFDM scheme or the like based on a multipath communication environment.

[Document 1] Makoto Itami, "Comprehensible OFDM technology", Ohmsha Ltd., Tokyo, 2005

[Document 2] Joseph Mitola III and Gerald Q. Maguire, Jr., "Cognitive Radio: Making Software Radios More Personal," IEEE Personal Communications, Vol. 6, No. 4, pp. 13-18, August 1999

[Document 3] Simon Haykin, "Cognitive Radio: Brain-Empowered Wireless Communications," IEEE Journal on Selected Areas in Communications, Vol. 23, No. 2, February 2005

[Document 4] Joseph Mitola III, Cognitive Radio Architecture: The Engineering Foundations of Radio XML, Wiley-Interscience, New Jersey, 2006

[Document 5] Junji Yamamoto, Ryouji Yamaoka, Seishi Hanaoka, Satoshi Yoshizawa, Tetsuhiko Hirata, "Proposal of Terminal Assignment Method for Cognitive Radio", Shingaku Giho, SR2006-41, November 2006

[Document 6] Bruce A. Fette, Cognitive Radio Technology, Newnes, 2006

[Document 7] Takayuki Sugawara, Shingo Miyazawa, Kiichi Miyanaga, "A Consideration Concerning Environment-adaptive OFDM system", Shingaku Giho, SR2006-57, November 2006

[Document 8] JP-A 11-234190 (KOKAI)

BRIEF SUMMARY OF THE INVENTION

A Doppler frequency estimating device of a first aspect of the present invention comprises: an inverse fast Fourier transform section which performs inverse fast Fourier transform for a channel estimation value obtained by channel estimation in a receiving device to obtain a channel impulse response; a selecting section which selects paths that belong to a group having a large element based on elements of paths for the channel impulse response obtained by the inverse fast Fourier transform section; a time averaging section which calculates autocorrelation values by time averaging for each of the paths selected by the selecting section; an ensemble averaging section which obtains an ensemble average value of the autocorrelation values by time averaging obtained by the time averaging section; and an estimating section which obtains a Doppler frequency associated with the ensemble average value based on a relationship characteristic indicative of a relationship between an autocorrelation value and an Doppler frequency and the ensemble average value obtained by the ensemble averaging section.

In the first aspect according to the present invention, the invention is represented as the device. However, as other aspects, the present invention may be represented as a receiving device including the Doppler frequency estimating device, a computer-readable recording medium, or a Doppler frequency estimating method, and others.

BRIEF DESCRIPTION OF THE SEVERAL VIEWS OF THE DRAWING

FIG. 5 is a graph showing an example when a Bessel function indicative of a relationship between an autocorrelation value and a maximum Doppler frequency is divided into a plurality of regions;

FIG. 6 is a view showing an example of a channel environment utilized for a simulation;

DETAILED DESCRIPTION OF THE INVENTION

Figure 1:
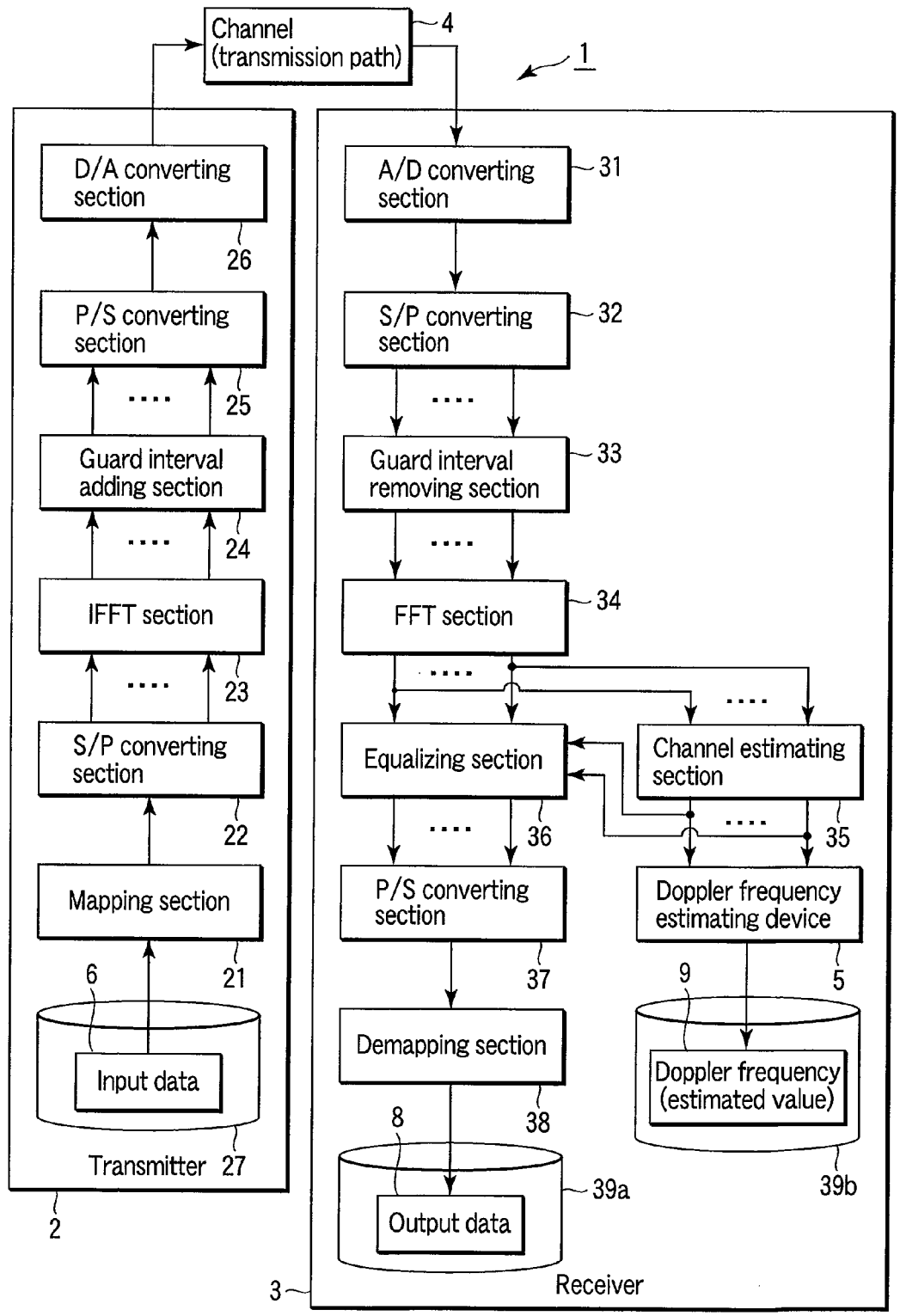
FIG. 1 is a block diagram showing an example of a communication system including a Doppler frequency estimating device according to an embodiment of the invention.

An embodiment according to the present invention will now be described hereinafter with reference to the accompanying drawings. It is to be noted that like reference numerals denote like parts in each of the following drawings.

In this embodiment, an example where OFDM is adopted as a communication scheme will be described, but the present invention can be likewise applied to other communication schemes.

This embodiment is applied to a communication environment where a transmitter is connected with a receiver through a multipath to enable transmission and reception. In this embodiment, a Doppler frequency is highly accurately estimated at a high speed.

FIG. 1 is a block diagram showing an example of a communication system including a Doppler frequency estimating device according to this embodiment.

Figure 2:
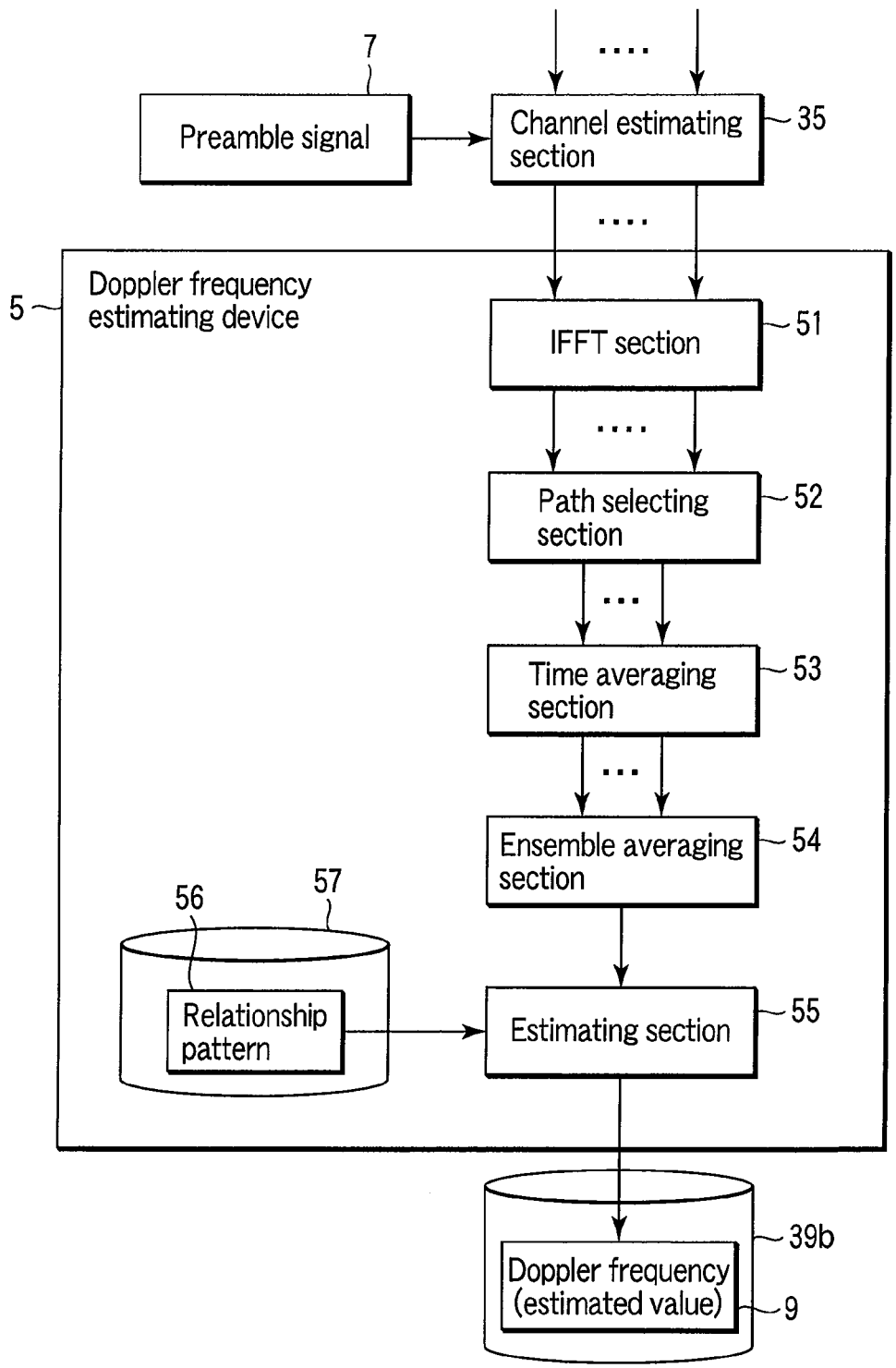
FIG. 2 is a block diagram showing an example of a configuration of the Doppler frequency estimating device according to the embodiment.

FIG. 2 is a block diagram showing an example of a configuration of the Doppler frequency estimating device according to this embodiment.

A communication system 1 is, e.g., an OFDM modulation/demodulation system, and the communication system 1 includes at least one transmitter 2, at least one receiver 3, and a channel 4 (a multipath: transmission path) between the transmitter 2 and the receiver 3. The transmitter 2 can transmit signals to receiver 3 through the channel 4.

The transmitted 2 includes a mapping section 21, a serial/parallel converting section 22, an inverse fast Fourier transform section 23, a guard interval adding section 24, a parallel/serial converting section 25, and a digital/analog converting section 26.

The receiver 3 includes an analog/digital converting section 31, a serial/parallel converting section 32, a guard interval removing section 33, a fast Fourier converting section 34, a channel estimating section 35, an equalizing section 36, a parallel/serial converting section 37, and a demapping section 38.

Moreover, the receiver 3 includes a Doppler frequency estimating device 5. This Doppler frequency estimating device 5 may be built in or externally provided to the receiver 3.

The Doppler frequency estimating device 5 includes an inverse fast Fourier converting section 51, a path selecting section 52, a time averaging section 53, an ensemble averaging section 54, and an estimating section 55. In this embodiment, the Doppler frequency estimating device 5 selects each path having a large SNR to suppress an estimation accuracy for an autocorrelation value from being lowered due to noise added through the channel 4 as the multipath, calculates time average values with respect to each of selected paths, and calculates an ensemble average value of the time average values of the selected paths.

In the transmitter 2, the mapping section 21 performs at least one of multilevel modulation and primary modulation of input data (an information bit string) 6 stored in, e.g., a storage device 27 to map a symbol string.

The serial/parallel converting section 22 executes serial/parallel conversion with respect to a serial signal mapped by the mapping section 21 to convert this signal into a parallel signal.

The inverse fast Fourier transform section 23 executes inverse fast Fourier transform with respect to a parallel signal fed from the serial/parallel converting section 22 to create an OFDM signal.

The guard interval adding section 24 adds a guard interval to the OFDM signal to create an OFDM signal with the guard interval.

The parallel/serial converting section 25 executes parallel/serial conversion with respect to the OFDM signal with the guard interval to convert this signal into a serial OFDM signal with the guard interval.

The digital/analog converting section 26 converts a digital OFDM signal with the guard interval obtained by the conversion of the parallel/serial converting section 2 into an analog OFDM signal with the guard interval, and transmits a converted signal to the receiver 3 through the channel 4 by using a carrier wave.

In the receiver 3, the analog/digital converting section 31 converts the analog OFDM signal with the guard interval received from the transmitter 3 through the channel 4 by using the carrier wave into the digital OFDM signal with the guard interval.

The serial/parallel converting section 32 executes serial/parallel conversion with respect to the digital OFDM signal with the guard interval to convert this signal into a parallel OFDM signal with the guard interval.

The guard interval removing section 33 removes the guard interval from the parallel OFDM signal with the guard interval to obtain the OFDM signal.

The fast Fourier transform section 34 executes the fast Fourier transform with respect to the OFDM signal.

The channel estimating section 35 executes channel estimation processing with respect to the signal subjected to a fast-Fourier-transformed signal obtained based on the fast Fourier transform of the fast Fourier transform section 34 by using a known preamble signal 7, thereby obtaining a channel estimation value (frequency domain channel characteristic).

The equalizing section 36 corrects a frequency response having undesirable amplitude or phase with respect to a fast-Fourier-transformed signal based on the fast-Fourier-transformed signal and the channel estimation value obtained by the channel estimating section 35, and executes processing of correcting an influence on the fast-Fourier-transformed signal from the channel 4.

The parallel/serial converting section 37 executes parallel/serial conversion with respect to a signal corrected by the equalizing section 36 to convert this signal into a serial signal.

The demapping section 38 performs the conversion that is opposite to the conversion executed by the mapping section 21 on the transmitter 2 side with respect to the serial signal. Additionally, for example, output data (an information bit string) 8 obtained by the demapping section 38 is stored in a storage device 39a.

The Doppler frequency estimating device 5 automatically selects each path having a high SNR (each path suitable for correlation function estimation) based on a channel impulse response of the channel 4 as the multipath, calculates a plurality of time average values required to estimate autocorrelation values of the plurality of selected paths, and further calculates an ensemble average of the plurality of time average values. Further, the Doppler frequency estimating device 5 divides a Bessel function into small regions in advance, compares the calculated ensemble average value with the Bessel function of the small region associated with this ensemble average value, and estimates a Doppler frequency 9 to be stored in a storage device 39b.

In the Doppler frequency estimating device 5, the inverse fast Fourier transform section 51 performs the inverse fast Fourier transform with respect to a channel estimation value (a channel estimation value) obtained by the channel estimating section 35 that uses the preamble signal 7, thereby obtaining a transmission impulse response (a channel impulse response estimation value). The channel impulse response includes elements such as an amplitude and/or power of each of a plurality of paths.

The path selecting section 52 selects a plurality of paths that belong to a group having a large amplitude and/or large power, e.g., paths each having a relatively large amplitude or/and relatively large power from the plurality of paths for the channel impulse response obtained by the inverse fast Fourier transform section 5. For example, this path selecting section 52 selects a plurality of paths each having a larger amplitude or/and larger power than predetermined threshold value in the channel impulse response obtained by the inverse fast Fourier transform section 51.

The time averaging section 53 obtains the autocorrelation values (time average values, time correlation values) by (based on) time averaging for each of amplitudes of paths for the channel impulse response selected by the path selecting section 52.

The ensemble averaging section 54 obtains an ensemble average value (an expectation value) of autocorrelation values by time averaging acquired by the time averaging section 53.

The estimating section 55 obtains a Doppler frequency associated with the ensemble average value based on a preset relationship pattern (a function) 56 indicative of a relationship between an autocorrelation value and a Doppler Frequency and the ensemble average value acquired by the ensemble averaging section 54. For example, this estimating section 55 obtains a maximum Doppler frequency associated with the ensemble average value based on a Bessel function indicative of a relationship between an autocorrelation value (a time correlation value) of the Rayleigh fading and an maximum Doppler frequency.

It is to be noted that the relationship pattern 56 indicative of the relationship between the autocorrelation value and the Doppler frequency may be divided into a plurality of regions in accordance with the autocorrelation value in this embodiment. In this case, the estimating section 55 selects a region to which the ensemble average value belongs from the plurality of regions and executes processing of obtaining the Doppler frequency associated with the ensemble average value in this selected region.

The relationship pattern 56 is stored in a storage device 57 in advance, and the estimating section 55 may access the relationship pattern 56 stored in the storage device 57 as required. Alternatively, the estimating section 55 may calculate the relationship pattern 56 as required (before utilized).

An outline of operations of the communication system will now be described.

The transmitter 2 in the communication system 1 first converts a bit string into a symbol string by the primary modulation. The transmitter 2 executes the serial/parallel conversion (S/P) with respect to the generated symbol string, and carries out the inverse fast Fourier transform processing to generate an OFDM signal. The transmitter 2 adds a guard interval (GI) to the generated OFDM signal, executes the parallel/serial conversion (P/S), and transmits the converted signal.

When this communication system 1 is an OFDM system, an influence of inter-symbol interference is efficiently reduced by the guard interval signal. However, this guard interval cannot suppress the influence of frequency selective fading. Thus, to correct signal degradation caused due to the frequency selective fading, the channel 4 is equalized in the receiver 3. In the communication system 1 according to this embodiment, the receiving device 3 uses the equalizing section 36 to perform equalization processing after removing the guard interval by the guard interval removing section 33 and performing the fast Fourier transform by the fast Fourier transform section 34.

Figure 3:
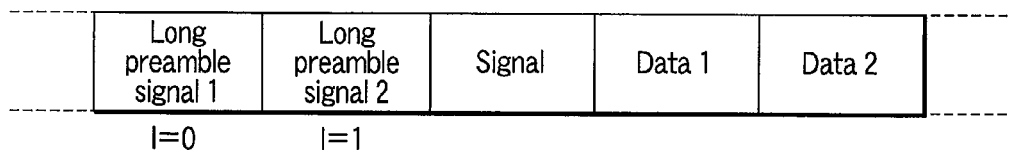
FIG. 3 is a view showing an example of a frame using long preamble signals.

FIG. 3 is a view showing an example of a frame using long preamble signals as the preamble signal 7. FIG. 3 shows an example of a frame using long preamble signals which are adopted in IEEE 802.11a.

A first received symbol in an ith frame is represented by Equation (numerical formula) (1). That is, a frequency domain transmitted/received signal in the communication system 1 as the OFDM system is given by Equation (1).

$$Y_{l,i}(k) = X_{l,i}(k) H_{l,i}(k) + Z_{l,i}(k) \quad (1)$$

where $X_{l,i}(k)$, $Y_{l,i}(k)$, $H_{l,i}(k)$, and $Z_{l,i}(k)$ represent a transmission symbol, a received symbol, a channel frequency response, and a noise component with respect to a kth sub-carrier, respectively.

Further, in the ith frame, zeroth and first OFDM symbols are determined as long preamble signals which are known in the transmitter/receiver.

A channel estimation value (multipath channel frequency characteristic) is estimated by using the long preamble signal based on Equation (2).

$$\hat{H}_{0,i}(k) = \frac{Y_{0,i}(k)}{X_{0,i}(k)} \qquad (2)$$
$$= \frac{H_{0,i}(k)X_{0,i}(k) + Z_{0,i}(k)}{X_{0,i}(k)}$$
$$\cong H_{0,i}(k)$$

Furthermore, the same processing is performed with respect to the long preamble signal l=1 to obtain $\hat{H}_{1,i}(k)$. When performing the equalization based on this channel estimation value, an average value of two channel estimation values is utilized with respect to all symbols in the i frame as represented by Equation (3).

$$\hat{H}_i(k) = \frac{1}{2}(\hat{H}_{0,i}(k) + \hat{H}_{1,i}(k)) \qquad (3)$$

In this case, a received symbol $\hat{Y}_{1,i}(k)$ after the equalization is represented by Equation (4).

$$\hat{Y}_{1,i}(k) = \frac{Y_{1,i}(k)}{\hat{H}_i(k)} \qquad (4)$$

Operations of the above-described Doppler frequency estimating device 5 will now be explained hereinafter.

The Doppler frequency estimating device 5 according to this embodiment utilizes the fact that each multipath as the channel 4 is statistically independent and uses the ensemble average value (the expectation value) in addition to the time average values, thereby obtaining the autocorrelation value.

The Doppler frequency estimating device 5 executes the inverse fast Fourier transform for a channel estimation value (frequency domain channel characteristic) obtained by the channel estimating section 35 based on each preamble signal which is already known on the receiver side, whereby a channel impulse response is estimated.

Furthermore, to utilize a path having a high SNR alone for estimation of the autocorrelation value, the Doppler frequency estimating device 5 selects a path having a high SNR from a plurality of paths for the obtained channel impulse response. Selecting the path having a high SNR in this manner enables improving an estimation accuracy for the maximum Doppler frequency.

Here, the autocorrelation value of each path for the channel impulse response varies with time. Thus, the Doppler frequency estimating device 5 calculates an autocorrelation value based on the time average with respect to each of a plurality of selected paths.

The Doppler frequency estimating device 5 calculates an ensemble average value of the acquired autocorrelation values by the time averaging for each of the paths to estimate an autocorrelation value $\hat{\rho}(d)$ of Rayleigh fading. As explained above, in this embodiment, the estimation of the autocorrelation value using the ensemble average value is carried out, which is not executed in conventional techniques.

Moreover, the Doppler frequency estimating device 5 uses a Bessel function indicative of the autocorrelation value (a time correlation value) of Rayleigh fading and a maximum Doppler frequency to compare the autocorrelation value $\hat{\rho}(d)$ of the channel 4 with the Bessel function, thereby estimating the maximum Doppler frequency.

It is to be noted that, in this embodiment, in order to increase a computing speed beyond that when comparing the autocorrelation value by time average for all Doppler frequencies obtained by the Bessel function with the estimated autocorrelation value $\hat{\rho}(d)$, a plurality of regions are provided with respect to the maximum Doppler frequency, a region to which the estimated autocorrelation value $\hat{\rho}(d)$ belongs is selected, and the estimated autocorrelation value $\hat{\rho}(d)$ is compared with the autocorrelation value by the time average in the Bessel function in the selected region.

Operations of the Doppler frequency estimating device 5 will now be described hereinafter in detail.

The autocorrelation estimation of Rayleigh fading will be first explained.

In the Doppler frequency estimating device 5 according to this embodiment, to improve a Doppler frequency estimation accuracy and shorten a time required for the estimation, the fact that Rayleigh fading independently occurs in each path in the channel 4 as the multipath is utilized.

Assuming that a channel impulse response of each of paths is $h_{l,i}(n)$, a relationship between an autocorrelation function of the impulse response and a zeroth-order Bessel function of the first kind is represented by Equation (5).

$$\rho(d) = \frac{C(d)}{C(0)} = \frac{E[h_{1,i}^* h_{1,i+d}]}{E[h_{1,i}^* h_{1,i}]} = J_0(2\pi f_D dT_F) \qquad (5)$$

where $f_D$, d, and $T_F$ represent a maximum Doppler frequency [Hz], a delay frame number, and a frame length [s], respectively. Additionally, $J_0(.)$ is a zeroth-order Bessel function of the first kind.

It is to be noted that the delay frame number d may be set by a device that determines a delay frame number, or it may be set by a user.

Applying the inverse fast Fourier transform to a channel estimation value $\hat{H}_{l,i}(k)$ obtained by the channel estimation using the long preamble signal performed by the channel estimating section 35 enables obtaining a channel impulse response $\hat{h}_{l,i}(n)$ represented by Equation (6).

$$\hat{h}_{l',i}(n) = \frac{1}{N}\sum_{k=0}^{N-1}\hat{H}_{l',i}(k)e^{j\frac{2\pi k}{N}n} \qquad (6)$$

where N is an FFT (fast Fourier transform) point number. Further, l' represents a long preamble.

It is to be noted that the FFT point number may be set by a device that determines the FFT point number, or it may be set by a user.

In a multipath environment, respective paths are statistically independent. Furthermore, since the maximum Doppler frequency fluctuates depending on a moving speed of a wireless station, the respective paths have the same maximum Doppler frequency. Therefore, an expectation value arithmetic operation can be introduced into the autocorrelation value estimation of a Rayleigh wave.

The channel impulse response obtained by Equation (6) includes a response for delay with no presence of paths, a path having a low SNR, and others. Thus, to suppress an influence of the response for the delay with no presence of paths and the path having a low SNR, a path having an amplitude or/and power equal to or above a given threshold value is selected for the autocorrelation value estimation, and this selected path is used.

To select the path, the estimated channel impulse response is normalized based on Equation (7).

$$\hat{h}'_{1',i}(n) = 10\log_{10}\left[\frac{|\hat{h}_{1',i}(n)|}{\max(\hat{h}_{1',i}(n))}\right][dB] \quad (7)$$

where $\max(\hat{h}_{1',i}(n))$ represents a maximum value of the channel impulse response.

Figure 4:
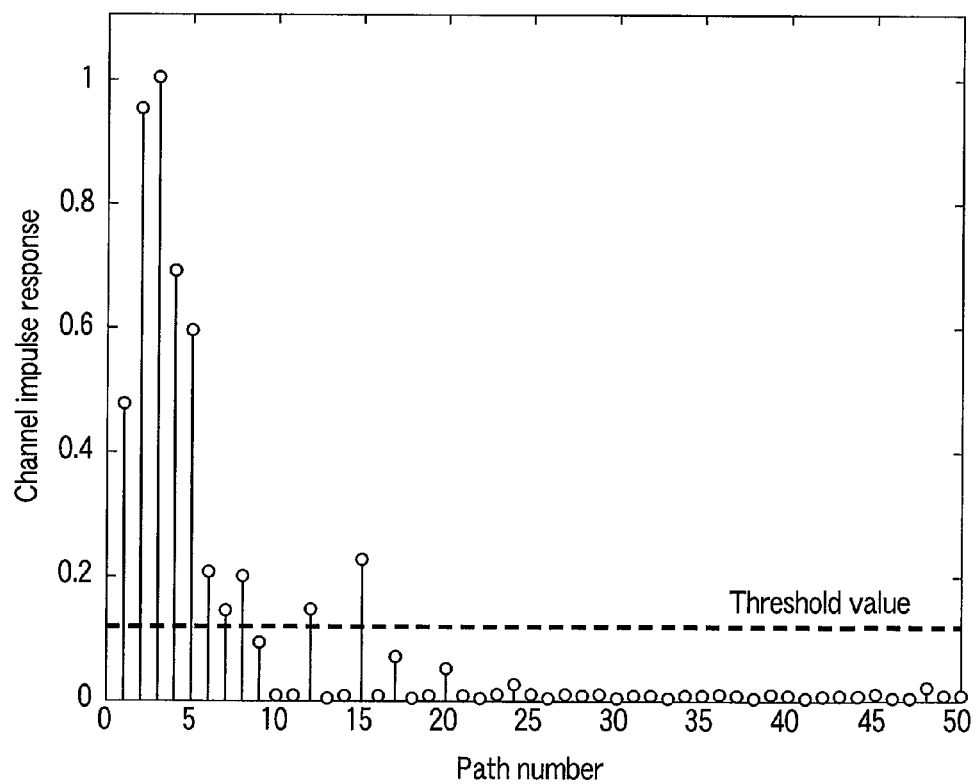
FIG. 4 is a graph showing an example of a relationship between paths and transmission impulse responses.

FIG. 4 is a graph showing an example of a relationship between the paths and the transmission impulse responses.

Further, as represented by Equation (8), a threshold value $\beta$ is used to select a path that an amplitude of the channel impulse response exceeds this threshold value $\beta$.

$$[p_1, p_2, \ldots p_L] = \{n | \hat{h}'_{1',i}(n) > \beta\} \quad (8)$$

where L denotes a detected path number (the number of channel impulse responses).

In this embodiment, after each path is selected, an autocorrelation value $\hat{C}_j(d)$ based on the time average is calculated with respect to each selected path by using Equation (9).

$$\hat{C}_j(d) = \frac{1}{N'}\sum_{i=1}^{N'}\left[\hat{h}^*_{1',i}(p_j)\hat{h}_{1',i+d}(p_j)\right] \quad j=1,2,\ldots,L \quad (9)$$

where N' represents a frame number. Likewise, a calculation for $\hat{C}_j(0)$ is performed as represented by Equation (10).

$$\hat{C}_j(0) = \frac{1}{N'}\sum_{i=1}^{N'}\left[\hat{h}^*_{1',i}(p_j)\hat{h}_{1',i}(p_j)\right] \quad j=1,2,\ldots,L \quad (10)$$

Based on the above-described calculation, the autocorrelation value of each path is represented by Equation (11).

$$\hat{\rho}_j(d) = \frac{\hat{C}_j(d)}{\hat{C}_j(0)} \quad j=1,2,\ldots,L \quad (11)$$

Furthermore, an ensemble average value of the autocorrelation values of the respective paths obtained as explained above is acquired, thereby representing the autocorrelation value $\hat{\rho}(d)$ by Equation (12).

$$\hat{\rho}(d) = \frac{1}{L}\sum_{j=1}^{L}\hat{\rho}_j(d) \quad (12)$$

The estimation of the maximum Doppler frequency will now be described.

In this embodiment, the autocorrelation value $\hat{\rho}(d)$ estimated based on the above-described calculation is compared with a value that is based on the Bessel function, thereby estimating the maximum Doppler frequency.

First, based on Equation (12), the ensemble average value of the autocorrelation values is calculated, and a value of the Bessel function with respect to the maximum Doppler frequency is also calculated. It is to be noted that the Bessel function indicative of the relationship between the autocorrelation value and the maximum Doppler function is divided into M ($\geq 1$) regions.

The Doppler frequency estimating device 5 determines a region including the estimated autocorrelation value $\hat{\rho}(d)$, and calculates a difference between the autocorrelation function $\hat{\rho}(d)$ and the value based on the Bessel function in the region determined to include the autocorrelation function $\hat{\rho}(d)$.

For example, in the Bessel function, a threshold value required to divide the autocorrelation value for the maximum Doppler frequency $f_{dm}$ ($m=1, 2, \ldots, M-1$) is set as represented by Equation (13).

$$\gamma_m = J_0(2\pi f_{dm} \cdot d \cdot T_F) (m=1,2,\ldots,M-1) \quad (13)$$

Furthermore, the Doppler frequency estimating device 5 determines a region including the estimated autocorrelation value $\hat{\rho}(d)$ based on the judgment in Equation (14).

$$\begin{array}{ll} \text{Region 1: } \gamma_1 \leq \hat{\rho}(d) & (0 \leq f_D \leq f_{d1}) \\ \text{Region 2: } \gamma_2 \leq \hat{\rho}(d) < \gamma_1 & (f_{d1} < f_D \leq f_{d2}) \\ \quad \vdots \\ \text{Region M: } \hat{\rho}(d) < \gamma_{M-1} & (f_{d(M-1)} < f_D) \end{array} \quad (14)$$

FIG. 5 is a graph showing an example when the Bessel function indicative of a relationship between an autocorrelation value of Rayleigh fading and a maximum Doppler frequency is divided into a plurality of regions. In this FIG. 5, an example where the Bessel function is divided into four regions will be described, but the number of the regions may be 1 or above.

The Doppler frequency estimating device 5 detects a value with which a squared value of a difference $\epsilon(f_D)$ of the autocorrelation value $\hat{\rho}(d)$ and the value obtained based on the Bessel function becomes minimum in regard to the region determined to include the estimated autocorrelation value (the ensemble average value) $\hat{\rho}(d)$ as represented by Equation (15).

$$\epsilon(f_D) = J_0(2\pi f_D dT_F) - \hat{\rho}(d) \quad (15)$$

Further, the Doppler frequency estimating device 5 determines the maximum Doppler frequency when the squared value of the difference $\epsilon(f_D)$ becomes minimum based on Equation (16).

$$\hat{f}_D = \{f_D | |\epsilon(f_D)|^2 \text{ is minimum}\} \quad (16)$$

The above-described Doppler frequency estimating device 5 according to this embodiment can highly accurately estimate the maximum Doppler frequency and increase the convergence rate of the estimation even though the channel 4 as the multipath is used.

When the highly accurately estimated maximum Doppler frequency is utilized to adjust a channel environment and an environment and a setting of the communication system, high-quality communication can be realized.

A simulation (an experiment) for verifying an effectiveness of the Doppler frequency estimating device 5 according to this embodiment and its result will now be described hereinafter.

A baseband model is utilized for the simulation explained herein.

FIG. 6 is a view showing an example of the channel environment utilized for the simulation. As shown in this FIG. 6, a multipath Rayleigh fading environment based on HIPERLAN/2 Model A is adopted for the channel 4 in the simulation (Akinori Taira, Fumio Ishizu, Makoto Miyake, "Timing Synchronization Method of OFDM Communication System in Frequency Selective Fading Environment", The Institute of Electronics, Information and Communication Engineers Transactions B, vol. J84-B, No. 7, pp. 1255-1264, September 2001).

Further, in the simulation, AWGN (Additive White Gaussian Noise) having $E_b/N_0=10$ dB is added as noise. A mapping scheme is 64-QAM, a sub-carrier number is 512, an FFT point number is 512, and a bandwidth is 80 MHz. As set values in the Doppler frequency estimating device 5, a delay frame number d is set to 60 frames, and a threshold value $\beta$ is set to −14 dB. Furthermore, a frame number N utilized for the calculation of $C\hat{}_j(d)$ and $C\hat{}_j(0)$ is 500. In this simulation, a comparative experiment for comparing a Doppler frequency estimation accuracy with that in a technique disclosed in Document 7 (which will be simply referred to as a "conventional method" hereinafter) is conducted. In the conventional method, a frame number utilized for the calculation of an autocorrelation value is 3000.

As the evaluation of a Doppler frequency estimation accuracy in this simulation, an NMSE (Normalized Mean Squared Error) represented by Equation (17) is utilized.

$$NMSE = 10\log_{10} E\left[\left|\frac{f_D - \hat{f}_D}{f_D}\right|^2\right][\text{dB}] \quad (17)$$

where $\hat{f}_D$, is an estimated maximum Doppler frequency and $f_D$ is a ideal value of the maximum Doppler frequency.

Figure 7:
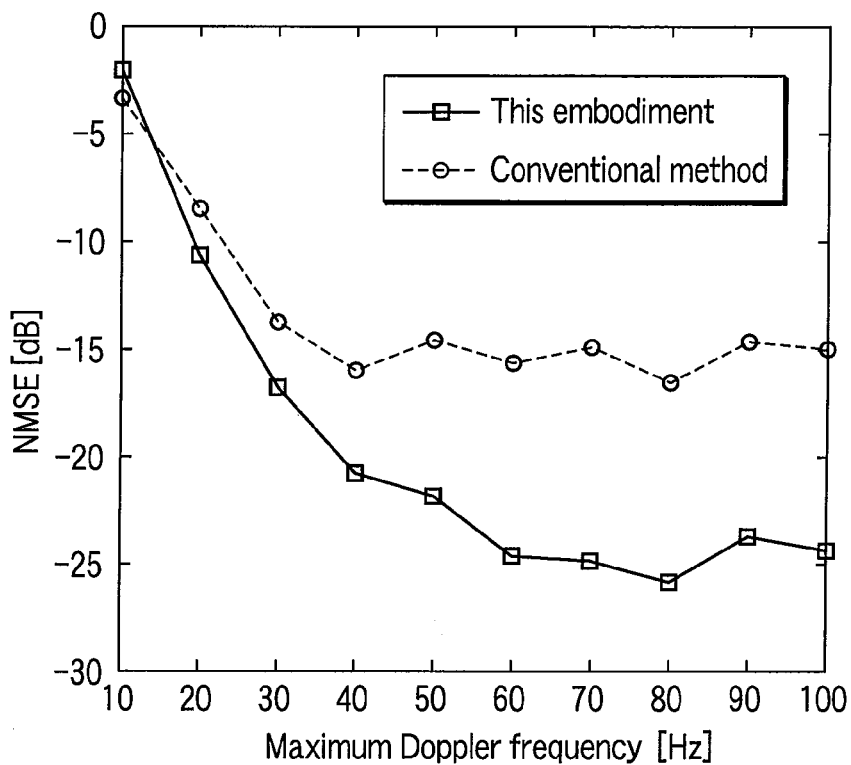
FIG. 7 is a graph showing an example of a result of comparing an evaluation value of the Doppler frequency estimating device according to the embodiment and an evaluation value according to a conventional method.

FIG. 7 is a graph showing an example of a result of comparing an evaluation value of the Doppler frequency estimating device 5 according to this embodiment and an evaluation value according to the conventional method.

As shown in FIG. 7, in the Doppler frequency estimating device 5 according to this embodiment, an estimation accuracy is greatly improved as the maximum Doppler frequency increases as compared with the conventional method. When the maximum Doppler frequency is 60 Hz or above, an improvement of approximately 10 dB can be confirmed in the Doppler frequency estimating device 5 according to this embodiment as compared with the conventional method. Moreover, in regard to the frame number required for the estimation of the Doppler frequency, 3036 frames are required when attaching importance to the estimation accuracy in the conventional method, but 560 frames can suffice in the Doppler frequency estimating device 5 according to this embodiment. Even if the frame number is 560 in this manner, the Doppler frequency estimating device 5 according to this embodiment can obtain the sufficient estimation accuracy, and a time required for the estimation can be decreased to approximately 20% of that in the conventional method, thus obtaining a great reduction.

The effectiveness of the Doppler frequency estimating device 5 according to this embodiment was confirmed from the above-described result.

It is to be noted that the channel estimating section 35 and the equalizing section 36 are separately configured in this embodiment, but the channel estimating section 35 may be included in the equalizing section 36. In this case, a channel estimation value is input from the equalizing section 36 in the fast Fourier transform section 51 of the Doppler frequency estimating device 5.

The present invention is not restricted to the foregoing embodiment, and it can be modified in may ways on an embodying stage without departing from the scope of the invention. Additionally, the foregoing embodiment includes inventions on various stages, and appropriately combining a plurality of disclosed constituent requirements enables extracting various inventions. For example, even if some constituent requirements embodiment are deleted from all constituent requirements disclosed in the embodiment, a configuration from which these constituent requirements are deleted can be extracted as an invention when problems can be solved and effects can be obtained.

Figure 8:
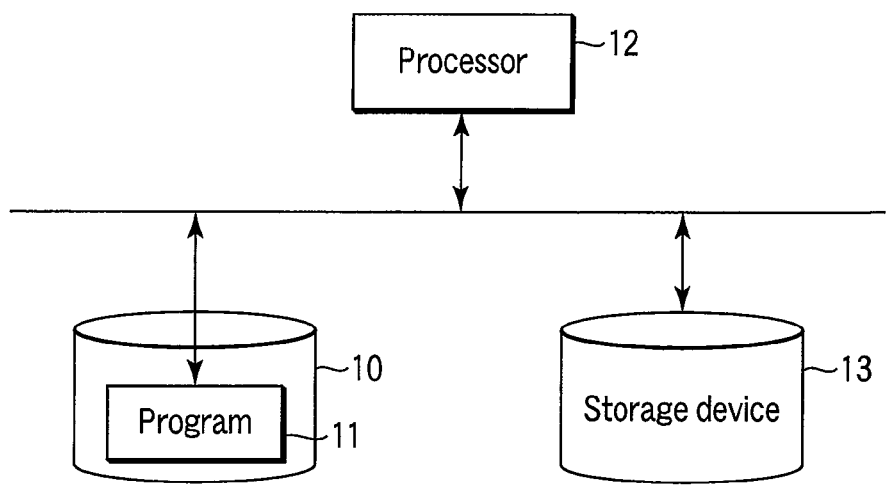
FIG. 8 is a block diagram showing an example of a configuration that enables a processor to realize operations as the Doppler frequency estimating device according to the embodiment.

For example, as shown in FIG. 8, a processor 12 may read a program 11 recorded in a recording medium 10, and the processor 12 may operate in accordance with this program 11, thereby realizing the respective constituent elements (the inverse fast Fourier transform section 51, the path selecting section 52, the time averaging section 53, the ensemble averaging section 54, and the estimating section 55) in the Doppler frequency estimating device 5 according to this embodiment. In this case, the processor 12 may operate while writing or reading various kinds of signals or data into or from a storage device 13.

What is claimed is:

1. A Doppler frequency estimating device comprising:
an inverse fast Fourier transform section which performs inverse fast Fourier transform for a channel estimation value obtained in a receiving device to obtain a channel impulse response;
a selecting section which selects paths that belong to a group having a large element based on elements of paths for the channel impulse response obtained by the inverse fast Fourier transform section;
a time averaging section which calculates autocorrelation values by time averaging for each of the paths selected by the selecting section;
an ensemble averaging section which obtains an ensemble average value of the autocorrelation values by time averaging obtained by the time averaging section; and
an estimating section which obtains a Doppler frequency associated with the ensemble average value based on a relationship characteristic indicative of a relationship between an autocorrelation value and a Doppler frequency and the ensemble average value obtained by the ensemble averaging section;
wherein the relationship characteristic is divided into a plurality of regions in accordance with the autocorrelation value, and
wherein the estimating section selects a region to which the ensemble average value belongs from the regions and calculates differences between autocorrelation values based on the relationship characteristic and the ensemble average value in the selected region to obtain the Doppler frequency associated with an autocorrelation value that minimizes the difference.

2. The device according to claim 1,
wherein the selecting section selects the paths each having an amplitude or power larger than a predetermined threshold value based on the channel impulse response obtained by the inverse fast Fourier transform section.

3. The device according to claim 1,
wherein the estimating section obtains a maximum Doppler frequency associated with the ensemble average value based on a Bessel function indicative of a relationship between an autocorrelation value of Rayleigh fading and the maximum Doppler frequency.

4. The device according to claim 1, wherein the Doppler frequency estimating device obtains a maximum Doppler frequency of an orthogonal frequency division multiplexing system.

5. A receiving device comprising:
a serial/parallel converting section which performs serial/parallel conversion for a received signal received through a channel as a multipath;
a removing section which removes a guard interval from a received signal converted by the serial/parallel converting section;
a fast Fourier transform section which performs fast Fourier transform for a received signal from which the guard interval has been removed by the removing section;
a channel estimating section which performs channel estimation using a preamble signal for a signal transformed by the fast Fourier transform section, thereby obtaining a channel estimation value;
an equalizing section which corrects an influence on the signal transformed by the fast Fourier transform section from the channel as the multipath based on a signal transformed by the fast Fourier transform section and the channel estimation value obtained by the channel estimating section;
a parallel/serial converting section which performs parallel/serial conversion for a signal equalized by the equalizing section;
a demapping section which executes demapping processing for a signal converted by the parallel/serial converting section;
an inverse fast Fourier transform section which performs inverse fast Fourier transform for the channel estimation value obtained by the channel estimating section to obtain a channel impulse response;
a selecting section which selects paths that belong to a group having a large amplitude or power from paths of the channel impulse response obtained by the inverse fast Fourier transform section;
a time averaging section which calculates autocorrelation values by time averaging for each of amplitudes of paths selected by the selecting section;
an ensemble averaging section which obtains an ensemble average value of the autocorrelation values by time averaging for selected paths acquired by the time averaging section; and
an estimating section which obtains a Doppler frequency associated with the ensemble average value based on a relationship characteristic indicative of a relationship between an autocorrelation value and a Doppler frequency and the ensemble average value obtained by the ensemble averaging section;
wherein the relationship characteristic is divided into a plurality of regions in accordance with the autocorrelation value, and
wherein the estimating section selects a region to which the ensemble average value belongs from the regions and calculates differences between autocorrelation values based on the relationship characteristic and the ensemble average value in the selected region to obtain the Doppler frequency associated with an autocorrelation value that minimizes the difference.

6. The device according to claim 5,
wherein the selecting section selects the paths each having the amplitude or power larger than a predetermined threshold value based on the channel impulse response obtained by the inverse fast Fourier transform section.

7. The device according to claim 5,
wherein the estimating section obtains a maximum Doppler frequency associated with the ensemble average value based on a Bessel function indicative of a relationship between an autocorrelation value of Rayleigh fading and the maximum Doppler frequency.

8. The device according to claim 5, wherein the Doppler frequency estimating device obtains a maximum Doppler frequency of an orthogonal frequency division multiplexing system.

9. A non-transitory computer-readable recording medium comprising a program recorded therein, wherein the program allows a computer to function as:
an inverse fast Fourier transform section which performs inverse fast Fourier transform for a channel estimation value which is stored in a first storage device and obtained by channel estimation in a receiving device, thereby obtains a channel impulse response, and stores the channel impulse response in a second storage device;
a selecting section which selects paths that belong to a group having a large element based on elements of paths for the channel impulse response which is stored in the second storage device and obtained by the inverse fast Fourier transform section, and stores the selected paths and their elements in a third storage device;
a time averaging section which obtains autocorrelation values by time averaging for each of the paths which are stored in the third storage device and selected by the selecting section, and stores the obtained autocorrelation values by time averaging in a fourth storage device;
an ensemble averaging section which obtains an ensemble average value of the autocorrelation values by time averaging that are stored in the fourth storage device and obtained by the time averaging section, and stores the ensemble average value in the fifth storage device; and
an estimating section which obtains a Doppler frequency associated with the ensemble average value based on a relationship characteristic indicative of a relationship between an autocorrelation value and a Doppler frequency and the ensemble average value that is stored in the fifth storage device and obtained by the ensemble averaging section, and stores the obtained Doppler frequency in a sixth storage device;
wherein the relationship characteristic is divided into a plurality of regions in accordance with the autocorrelation value, and
wherein the estimating section selects a region to which the ensemble average value belongs from the regions and calculates differences between autocorrelation values based on the relationship characteristic and the ensemble average value in the selected region to obtain the Doppler frequency associated with an autocorrelation value that minimizes the difference.

10. The recording medium according to claim 9,
wherein the selecting section selects the paths each having an amplitude or power larger than a predetermined threshold value based on the channel impulse response obtained by the inverse fast Fourier transform section.

11. The recording medium according to claim 9,
wherein the estimating section obtains a maximum Doppler frequency associated with the ensemble average value based on a Bessel function indicative of a relationship between an autocorrelation value of Rayleigh fading and the maximum Doppler frequency.

12. The recording medium according to claim 9, wherein the Doppler frequency estimating device obtains a maximum Doppler frequency of an orthogonal frequency division multiplexing system.

13. A Doppler frequency estimating method of communication system comprising:
- performing inverse fast Fourier transform for a channel estimation value obtained by channel estimation in a receiving device to obtain a channel impulse response;
- selecting paths that belong to a group having a large element based on elements of paths for the channel impulse response;
- calculating autocorrelation values by time averaging for each of the paths that belong to the group having the large element;
- obtaining an ensemble average value of the calculated autocorrelation values by time averaging; and
- obtaining a Doppler frequency associated with the ensemble average value based on a relationship characteristic indicative of a relationship between an autocorrelation value and a Doppler frequency and the ensemble average value;
- wherein the relationship characteristic is divided into a plurality of regions in accordance with the autocorrelation value, and
- wherein obtaining a Doppler frequency comprises selecting a region to which the ensemble average value belongs from the regions and calculates differences between autocorrelation values based on the relationship characteristic and the ensemble average value in the selected region to obtain the Doppler frequency associated with an autocorrelation value that minimizes the difference.

* * * * *